United States Patent
Koshinaka

[11] Patent Number: 6,115,506
[45] Date of Patent: *Sep. 5, 2000

[54] CHARACTER RECOGNITION METHOD, CHARACTER RECOGNITION APPARATUS AND RECORDING MEDIUM ON WHICH A CHARACTER RECOGNITION PROGRAM IS RECORDED

[75] Inventor: Takafumi Koshinaka, Tokyo, Japan

[73] Assignee: NEC Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/071,034

[22] Filed: May 4, 1998

[30] Foreign Application Priority Data

May 7, 1997 [JP] Japan ................................. 9-116978

[51] Int. Cl.$^7$ ....................................... G06K 9/36

[52] U.S. Cl. ........................................ 382/290; 382/177

[58] Field of Search ................................. 382/174, 177, 382/185, 187, 290, 293, 291, 292, 296, 289, 184, 287, 294; 358/443

[56] References Cited

U.S. PATENT DOCUMENTS

| | | | |
|---|---|---|---|
| 4,878,124 | 10/1989 | Tsujimoto et al. ........................ | 358/443 |
| 4,941,189 | 7/1990 | Britt ........................................... | 382/46 |
| 5,408,540 | 4/1995 | Zlotnick .................................... | 382/46 |
| 5,432,868 | 7/1995 | Obata et al. ............................. | 382/187 |
| 5,452,374 | 9/1995 | Cullen et al. ............................ | 382/293 |
| 5,563,403 | 10/1996 | Bessho et al. ........................ | 250/208.1 |
| 5,583,956 | 12/1996 | Aghajan et al. ......................... | 382/290 |
| 5,613,016 | 3/1997 | Saitoh ...................................... | 382/174 |
| 5,668,891 | 9/1997 | Fan et al. ................................. | 382/168 |
| 5,668,898 | 9/1997 | Tatsuta .................................... | 382/290 |
| 5,692,069 | 11/1997 | Hanson .................................... | 382/171 |
| 5,781,660 | 7/1998 | Nitta et al. ............................... | 382/177 |

FOREIGN PATENT DOCUMENTS

| | | |
|---|---|---|
| 0 476 806 A2 | 3/1992 | European Pat. Off. . |
| 0 601 730 A1 | 6/1994 | European Pat. Off. . |
| 59-153268 | 9/1984 | Japan . |
| 62-49593 | 3/1987 | Japan . |
| 63-33195 | 7/1988 | Japan . |
| 3-225578 | 10/1991 | Japan . |
| 4-276888 | 10/1992 | Japan . |
| 5-114046 | 5/1993 | Japan . |
| 6-68302 | 3/1994 | Japan . |
| 6-68304 | 3/1994 | Japan . |
| 07192088 | 7/1995 | Japan . |
| 7-311814 | 11/1995 | Japan . |

OTHER PUBLICATIONS

Japanese Office Action, dated Sep. 14, 1999, with English language translation of Japanese Examiner's comments.

Michael Kass, et al., "Snakes: Active Contour Models", International Journal of Computer Vision, 1988, pp. 321–331.

Primary Examiner—Bhavesh Mehta
Assistant Examiner—Kanji Patel
Attorney, Agent, or Firm—McGuire, Woods, Battle & Boothe, LLP

[57] ABSTRACT

The invention provides a character recognition apparatus wherein wrong correction in slant correction processing of a character string is minimized to minimize erroneous recognition. A character slant estimation section receives an image, calculates slant angle candidates and evaluation values of them, and calculates a slant angle estimated value based on the evaluation values. An estimated value evaluation section receives the evaluation values, calculates an information amount of the evaluation values or the like, and outputs it as a validity of the slant angle estimated value. A slant correction section receives and normalizes the validity to a value from 0 to 1 and determines the normalized value as an execution coefficient for slant correction. The slant correction section receives the slant angle estimated value and performs slant correction conversion of the image using a value obtained by multiplying the slant angle estimated value by the execution coefficient of the slant correction as an actual slant correction amount, and then outputs the resulting image to a character recognition section.

17 Claims, 6 Drawing Sheets

EVALUATION VALUE y

X

SLANT ANGLE x

FIG. 5

PRIOR ART

PRIOR ART

FIG. 7

PRIOR ART

PRIOR ART

CHARACTER RECOGNITION METHOD, CHARACTER RECOGNITION APPARATUS AND RECORDING MEDIUM ON WHICH A CHARACTER RECOGNITION PROGRAM IS RECORDED

BACKGROUND OF THE INVENTION

1. Field of the Invention

This invention relates to a character recognition method and a character recognition apparatus wherein a character string written on paper or a hand-written character string of words and so forth are optically read in by an optical sensor and a recording medium on which a character recognition program for carrying out the character recognition method is recorded.

2. Description of the Related Art

Conventionally, in a character recognition apparatus of the type mentioned, in order to cut out a character correctly from a character string or in order to extract a stable feature from a character image and recognize the character correctly, slant correction processing of the character is performed based on some evaluation value which indirectly indicates a slant of the character which is one of important factors of deformation of the character. For example, in a character recognition apparatus of the type which effects slant correction processing, a directionality of a character is checked using a chain code histogram, and the direction which exhibits the highest frequency is determined as a direction of the slant of the character. Then, the slant of the character is corrected based on the direction. Another character recognition apparatus is disclosed in Japanese Patent Laid-Open Application No. Heisei 5-114046 under the title of "Method and Apparatus for Normalizing the Characteristic Slant Angle of a Hand-Written Character". In the method and apparatus disclosed in the document, the entropy of a projection histogram of an input image regarding a predicted direction of the slant is calculated, and the slant angle with which the entropy exhibits a minimum value is determined. Then, the position of the input image is converted by an angle equal to the slant angle to correct the slant of the character.

However, the conventional slant correction processing basically takes a policy that it is assumed that a large number of strokes in a direction (hereinafter referred to as vertical direction) perpendicular to the direction of a character string are present in an input character image and the image is corrected so that the large number of existing vertical strokes may be directed in the vertical direction. In other words, correction is performed using such an evaluation value which is high in the vertical direction.

Figure 3:
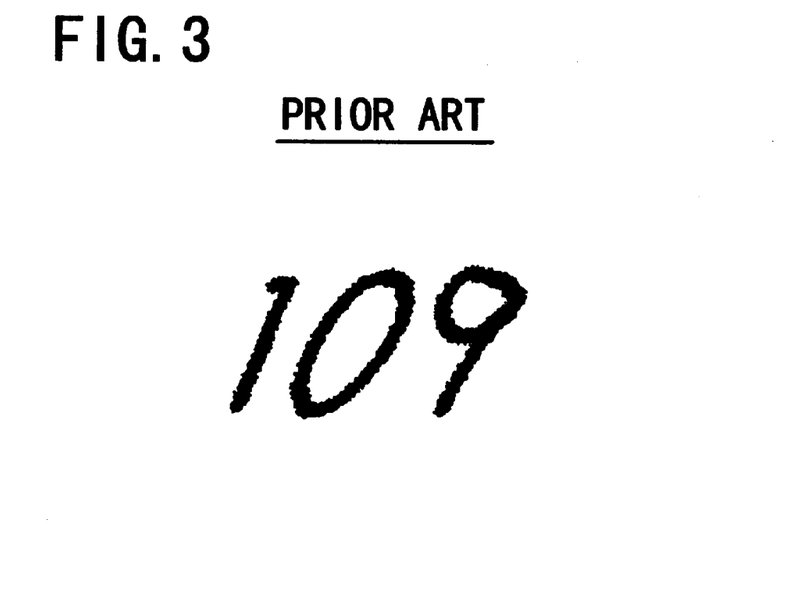
FIG. 3 is a schematic view showing an example of a character image for which slant correction processing can be performed comparatively easily.
Figure 4:
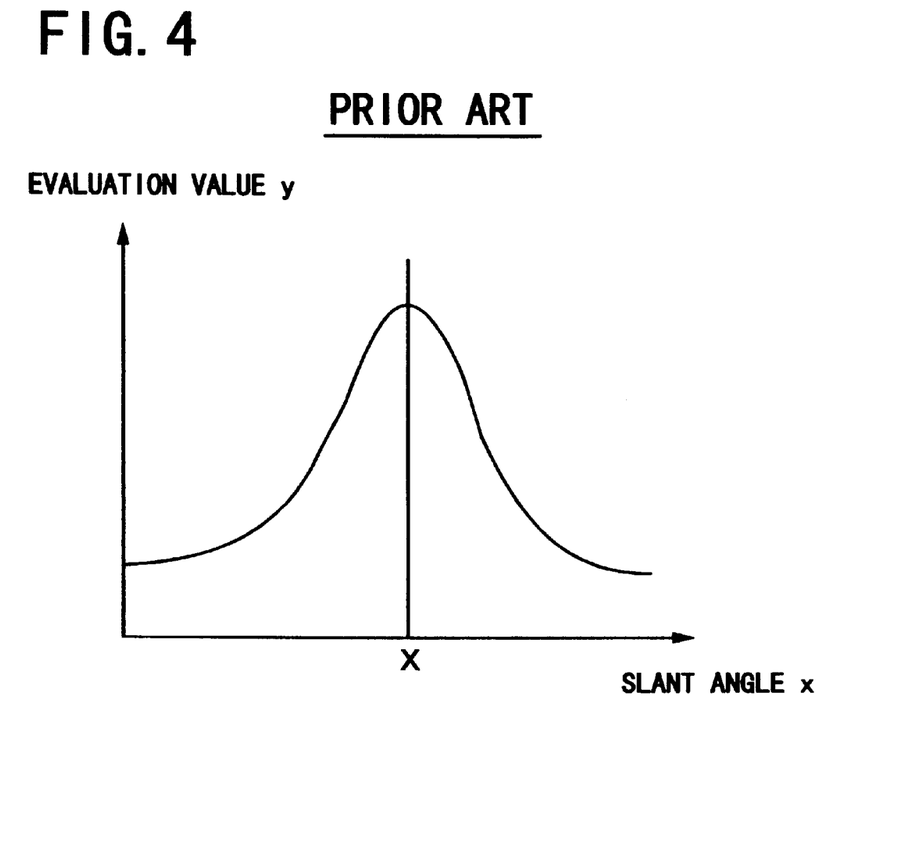
FIG. 4 is a diagram illustrating a result of an evaluation value calculation when the character image of FIG. 3 is inputted.

Accordingly, if such a character image which includes many vertical strokes as shown in FIG. 3 is inputted, then since the evaluation values exhibit high values only in the proximity of an actual slant angle X as seen in FIG. 4, estimation of the slant angle can be performed accurately and appropriate correction can be performed.

Figure 5:
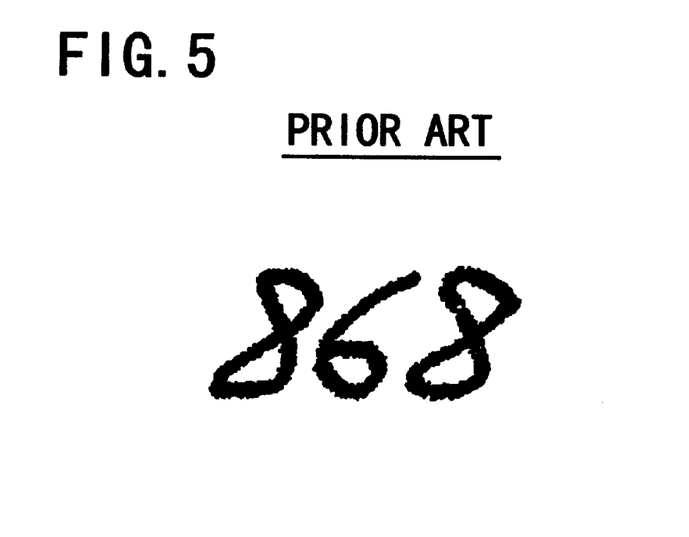
FIG. 5 is a schematic view showing an example of a character image for which slant correction processing cannot be performed readily.
Figure 6:
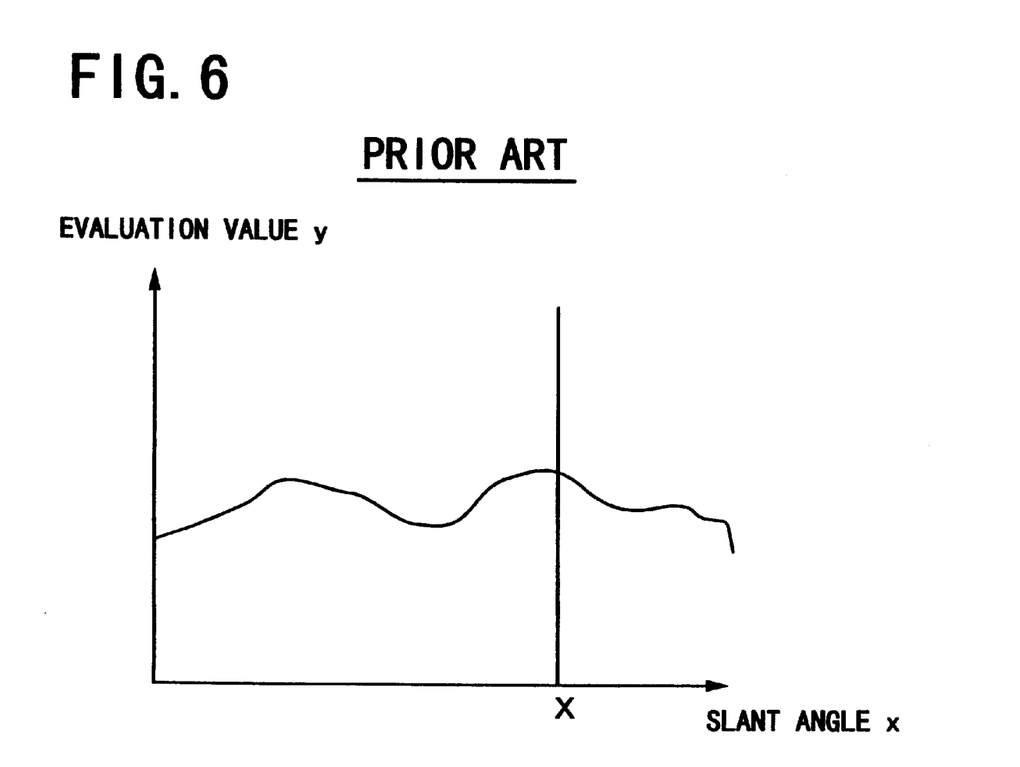
FIG. 6 is a diagram illustrating a result of an evaluation value calculation when the character image of FIG. 3 is inputted.
Figure 7:
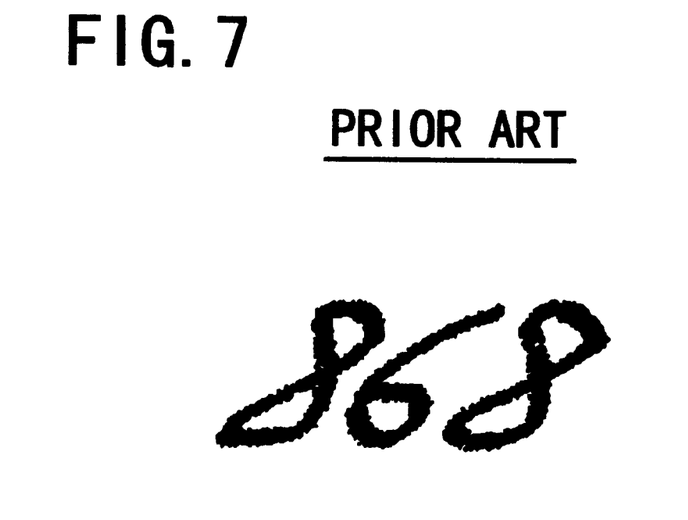
FIG. 7 is a schematic view illustrating an example of a character image for which wrong slant correction is liable to be performed by a conventional character recognition apparatus.

However, if a character image which does not include a very large number of vertical strokes as seen in FIG. 5 is inputted, then since the evaluation values do not always exhibit conspicuous values in the proximity of the actual slant angle X as seen in FIG. 6, there is a problem in that an error occurs in estimation of the slant angle and appropriate correction cannot be effected. For example, it sometimes occurs that, as seen in FIG. 7, as a result of an error in estimation of the slant angle, correction which increases the slant is performed.

In particular, there is a problem in that, where the evaluation value indicative of a slant of a character does not assume a conspicuous value only in the proximity of a particular angle but no very conspicuous variation appears even if the angle is varied, it is difficult to estimate the slant angle of the character, and wrong slant correction is likely to be performed. Such inappropriate correction has a bad influence on later character segmentation, feature extraction and discrimination.

SUMMARY OF THE INVENTION

It is an object of the present invention to provide a character recognition method and a character recognition apparatus wherein wrong correction is less likely to occur in slant correction processing and wrong recognition is minimized and a recording medium on which a character recognition program for carrying out the character recognition method is recorded.

According to the present invention, the object described above is achieved by estimating a slant angle of a character, calculating an evaluation value indicative of a validity of the slant angle estimated value, that is, an evaluation value which indicates to which degree the slant angle estimated value is reliable, and adjusting a slant correction amount based on the evaluation value. Where the evaluation value is high, it is determined that the slant angle estimated value is reliable and the slant angle estimated value is used as the correction amount, but where the evaluation value is low, it is determined that the slant angle estimated value is not reliable and the correction amount is adjusted in accordance with the magnitude of the evaluation value. Correction is performed based on the correction amount obtained in this manner, and thereafter, character recognition is performed for the slant-corrected character.

In particular, according to an aspect of the present invention, there is provided a character recognition method wherein a slant angle of a character is corrected to recognize the character, comprising the steps of estimating a slant angle of a character, evaluating a validity of the slant angle estimated value, determining a slant correction amount from the slant angle estimated value and the validity evaluation value, and performing slant correction of the character based on the slant correction amount and then performing character recognition of the character.

According to another aspect of the present invention, there is provided a character recognition method wherein a slant angle of a character is corrected to recognize the character, comprising the steps of estimating a slant angle of a character, evaluating a validity of the slant angle estimated value, determining a slant correction amount from the slant angle estimated value and the validity evaluation value, performing slant correction of the character based on the slant correction amount and then performing character recognition of the character to extract character recognition candidates, and discriminating based on the validity evaluated value whether or not a stroke group in a character image has a fixed directionality to selectively adopt the character recognition candidates to decrease the number of candidates.

According to a further aspect of the present invention, there is provided a character recognition apparatus wherein a slant angle of a character is corrected to recognize the character, comprising character slant estimation means for calculating and outputting an estimated value of a character, estimated value evaluation means for calculating and outputting an evaluation value representative of a validity of the estimated value, and slant correction means for determining a character slant correction amount based on outputs of the character slant estimation means and the estimated value evaluation means to effect slant correction of the character.

The character slant estimation means may set a plurality of slant angle candidates, calculate evaluation values representative of degrees of correctness of the slant angle candidates, calculate a slant angle estimated value based on the evaluation values representative of the degrees of correctness, and output the slant angle estimated value together with the evaluation value representative of the degree of correctness.

When the slant angle estimated value is to be calculated based on the evaluation values representative of the degrees of correctness, the character slant estimation means may search for the highest value of the evaluation values representative of the degrees of correctness and determine one of the slant angle candidates which corresponds to the highest value as the slant angle estimated value.

The estimated value evaluation means may calculate and output an information amount that the entire evaluation values representative of the degrees of correctness outputted from the character slant estimation means has as an evaluation value representative of a validity of the slant estimated value outputted from the character slant estimation means.

The estimated value evaluation means may calculate and output a square sum, a square integral or a variance of the evaluated values indicative of the degrees of correctness outputted from the character slant estimation means as the evaluation value representative of the validity of the slant estimated value outputted from the character slant estimation means.

The slant correction means may normalize the evaluation value outputted from the estimated value evaluation means and indicative of the validity to a value from 0 to 1 using a monotone non-decreasing function and utilize the normalized value as a coefficient for adjustment of the magnitude of the slant correction amount.

A Sigmoid function, a linear function or a sectional linear function may be used as the monotone non-decreasing function.

The character recognition apparatus may further comprise recognition candidate reduction means for discriminating based on the output of the estimated value evaluation means whether or not a stroke group in a character image has a fixed directionality to selectively adopt the character recognition candidates to reduce the number of candidates.

According a still further aspect of the persent invention, there is provided a recording medium on which a recognition program which operates on a computer is recorded, the character recognition program causing the computer to execute the steps of estimating a slant angle of a character, evaluating a validity of the slant angle estimated value, determining a slant correction amount from the slant angle estimated value and the validity evaluation value, and performing slant correction of the character based on the slant correction amount and then performing character recognition of the character.

Figure 8:
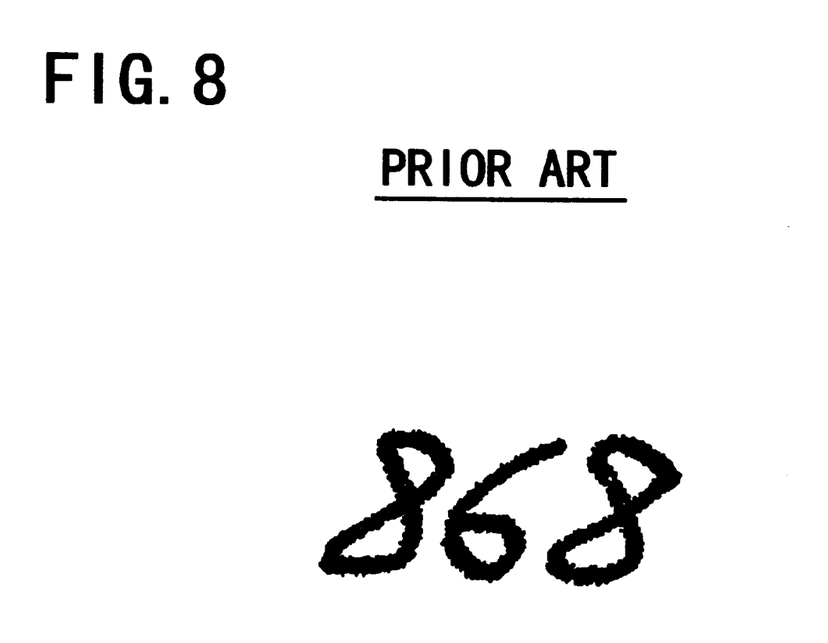
FIG. 8 is a schematic view illustrating an example of a character image for which wrong slant correction is prevented by the present invention.

With the character recognition methods, character recognition apparatus and the recording medium, the slant correction amount can be adjusted adaptively in response to the information amount that an evaluation value indicative of a degree of correctness of a slant angle has, that is, a validity of the slant angle estimated value, and such a situation that wrong correction is performed also where it is difficult to calculate a slant angle as seen from FIG. 8 can be prevented, and character segmentation, feature extraction and recognition can be performed with a higher degree of stability and character recognition which exhibits little errors can be realized. Further, by decreasing the number of character recognition candidates based on the validity, succeeding selection of a recognition result in which language knowledge is used is facilitated. In other words, the time required to search for a linguistically appropriate character string can be reduced, and also the possibility that a wrong character string may be selected as a correct answer can be suppressed.

The above and other objects, features and the advantages of the present invention will become apparent from the following description and the appended claims, taken in conjunction with the accompanying drawings in which like parts or elements are denoted by like reference symbols.

DESCRIPTION OF THE PREFERRED EMBODIMENTS

Figure 1:
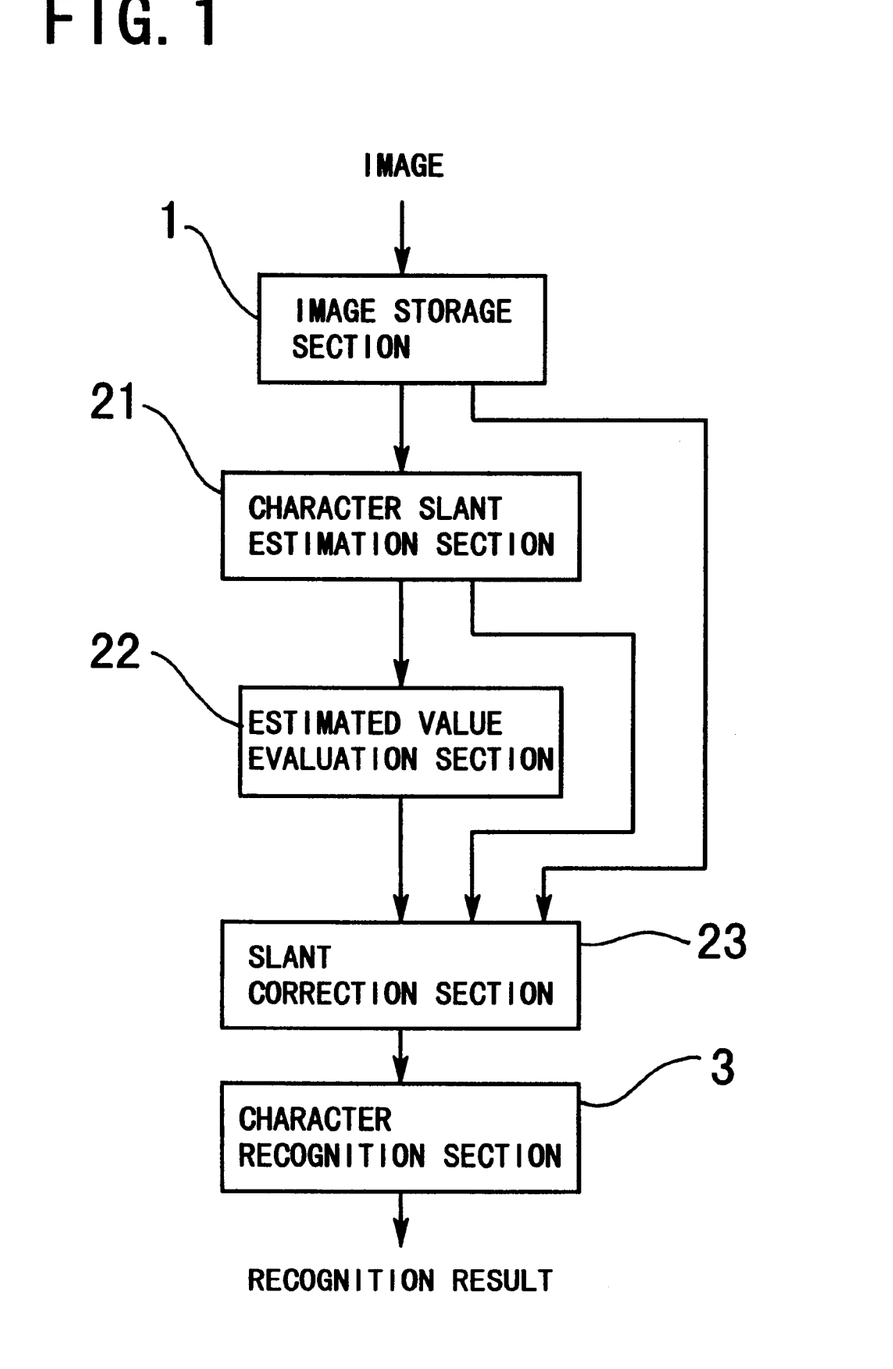
FIG. 1 is a block diagram showing a functional construction of a character recognition apparatus to which the present invention is applied.

Referring first to FIG. 1, there is shown in block diagram a character recognition apparatus to which the present invention is applied. The character recognition apparatus shown includes an image storage section 1 for storing a character image, a character slant estimation section 21 for calculating and outputting an estimated value of the slant angle of a character, an estimated value evaluation section 22 for calculating and outputting an evaluation value indicative of a validity of the estimated value, a slant correction section 23 for determining a character slant correction amount based on outputs of the character slant estimation section 21 and the estimated value evaluation section 22 to effect slant correction of the character with the character slant correction amount, and a character recognition section 3 for recognizing and outputting the slant-corrected character.

It is to be noted that, when character recognition is to be performed, it is usually the case to perform pre-processing for an input image, and for the pre-processing, binarization processing for converting a gray-level image into a binarized image which can be handled more easily than the gray-level image, normalization processing for normalizing the size of a character, the distance between strokes and so forth to shape the character, noise removal processing for removing noise such as fine stain or blurring in an image and so forth are available. Though not shown in FIG. 1, such pre-processing may be employed when necessary. Further, such pre-processing can be employed irrespective of whether it is before or after the slant correction processing.

An image is optically inputted by a scanner or a like apparatus, stored into the image storage section 1 and then sent to the character slant estimation section 21 and the slant correction section 23.

The character slant estimation section 21 assumes a plurality of slant angles of a character string in a character string image like x1, x2, . . . , xn, calculates evaluation values y1, y2, . . . , yn indicative of the degrees of the correctness of the slant angles, and outputs the evaluation values y1, y2, . . . , yn to the estimated value evaluation section 22. FIG. 4 or 6 shows the evaluation values y1, y2, . . . , yn in the form of a graph. Thereafter, the slant angle xi at which the evaluation value yi exhibits the highest value is selected, and the value xi is outputted as the estimated value x of the slant angle of the character to the estimated value evaluation section 22 and the slant correction section 23.

For the calculation of the evaluation value yi, for example, square sums of the projection histogram from the angle xi is used. In particular, where the projection histogram of the character image-from the direction of the angle xi is represented by a sequence of numbers h1(xi), h2(xi), . . . , hj(xi), . . . , the evaluation value yi is represented by the following expression.

$$y_i = \sum_j \{h_j(x_i)\}^2$$

The slant angle which corresponds to one of the evaluation values y1, y2, . . . , yn which exhibits the highest value is selected from among x1, x2, . . . , xn and outputted as an estimated value X of the slant angle of the character.

As another calculation method for the evaluation value yi, a chain code which represents a transition process of the directions of contours of a character is used. From a chain code, contour elements are counted for individual directions to produce a histogram (frequency distribution) for the individual directions. The histogram is used as the evaluation values y1, y2, . . . , yn of the slant angle. Thus, the slant angle at which the histogram exhibits the highest value is selected from among x1, x2, . . . , xn and outputted as the estimated value X of the slant angle of the character. It is to be noted that, since, also where a gray-level image is handled, contours can be extracted by using a dynamic contour extraction method such as a Snakes method disclosed in Michael Kasset et al., "Snakes: Active Contour Models", *International Journal of Computer Vision*, 1,988, pp.321–331, similar evaluation value calculation can be applied. Further, in addition to the methods wherein the direction of a stroke is measured from a contour, another method wherein the direction is specified based on the ratio or the finite difference in run length of connected components black pixels in various directions including vertical, horizontal and oblique directions may be employed.

The estimated value evaluation section 22 receives the slant angle estimated value X and the set of the evaluation values y1, y2, . . . , yn from the character slant estimation section 21, calculates the validity R of the estimated value X and outputs it to the slant correction section 23.

Here, as the validity R of the estimated value X, for example, the information amount that the set of the evaluation values y1, y2, . . . , yn has or another value proportionate to the information amount is used. For example, the validity R of the estimated value X is calculated in accordance with $$R = \sum_i y_i \log y_i$$

It is discriminated that, as the value R increases, the validity of the estimated value X becomes higher.

Here, for the calculation of R, also a realization method wherein the evaluation values y1, y2, . . . , yn are suitably normalized may be employed. In particular, in order to widen the range of the validity R of the estimated value and verify the validity R in more detail, the evaluation values y1, y2, . . . , yn are multiplied by a suitable constant p, and then another suitable constant q is subtracted from the sums, whereafter the validity of the estimated value is calculated in accordance with $$R = \sum_i (py_i - q)\log(py_i - q)$$

Alternatively, R may be calculated, for example, in accordance with $$R = \sum_i y_i^2$$

Also in this instance, it is determined that, as R increases, the validity of the estimated value becomes higher.

Here, for the calculation of R, also a realization method wherein the values of the evaluation values y1, y2, . . . , yn are suitably normalized may be used. In particular, in order to widen the range of the validity of the estimated value and verify the validity in more detail, the evaluation values y1, y2, . . . , yn are multiplied by a suitable constant p, and then another suitable constant q is subtracted from the sums, whereafter the validity of the estimated value is calculated in accordance with $$R = \sum_i (py_i - q)^2$$

Further, for R, also a realization form which uses, for example, a variance of evaluation values can possibly be used. In particular, if an operation for calculation of a mean value is represented by E(*), then the validity of the estimated value can be calculated in accordance with $$R = E(yi^2) - E(yi)^2$$

The slant correction section 23 receives the character image from the image storage section 1, receives the estimated value X from the character slant estimation section 21 and receives the validity R of the estimated value from the estimated value evaluation section 22. The slant correction section 23 calculates a slant correction amount X* using the received values to effect slant correction. Then, the slant correction section 23 outputs the image after the correction to the character recognition section 3. For the concrete method for slant correction, for example, a method wherein the character image is shearing deformed by −X* is available. Also, another method wherein, for example, the character image is rotation converted by −X* is available. The methods are described in more detail. For example, where the image is to be shearing deformed, pixels at higher positions are moved by larger amounts in a horizontal direction so that a square may be deformed into a parallelogram. A pixel at the position (x, y) should be moved to (x−Xxy/h, y) by shearing deformation by −X* (pixel). Meanwhile, for the rotation conversion, the image should be rotated. In this instance, a pixel at the position (x, y) is moved to (x cos X*−y sin X*, y cos X*+x sin X*) by rotation by −X* (angle).

The slant correction amount X* is calculated in accordance with $$X^* = f(R) \times X$$

where f(R) is a monotone decreasing function which assumes a value from 0 to 1, and is realized, for example, by a Sigmoid function of $$f(R) = 1/(1+e^{(-aR+b)})$$

where a, b are constants, and a>0. Alternatively, f(R) may be realized, for example, by a linear function $$f(R) = aR+b$$

where a, b are constants, and a>0. Where the validity R of the estimated value is high, the slant of the image is corrected substantially in accordance with the estimated slant angle, but where the validity R of the estimated value is low, only correction by a small amount is performed to prevent erroneous correction.

The character recognition section 3 performs such processing as character segmentation, feature extraction, or discrimination for the image and outputs a recognition result of characters. In particular, in the character segmentation, where the character string is, for example, a horizontal character string, a projection histogram in the vertical direction is calculated, and several positions of the histogram at which the frequency is low are detected and the character string is cut at the positions to cut out characters. In the feature extraction, the character image is converted into small sets of feature value necessary for recognition of the characters. In the discrimination, sets of feature values with which correct answers are known, that is, templates, are prepared in advance, and the templates are compared with the sets of feature value extracted from the input image to select that template which is near to the input, and then a character code corresponding to the template is outputted.

Figure 2:
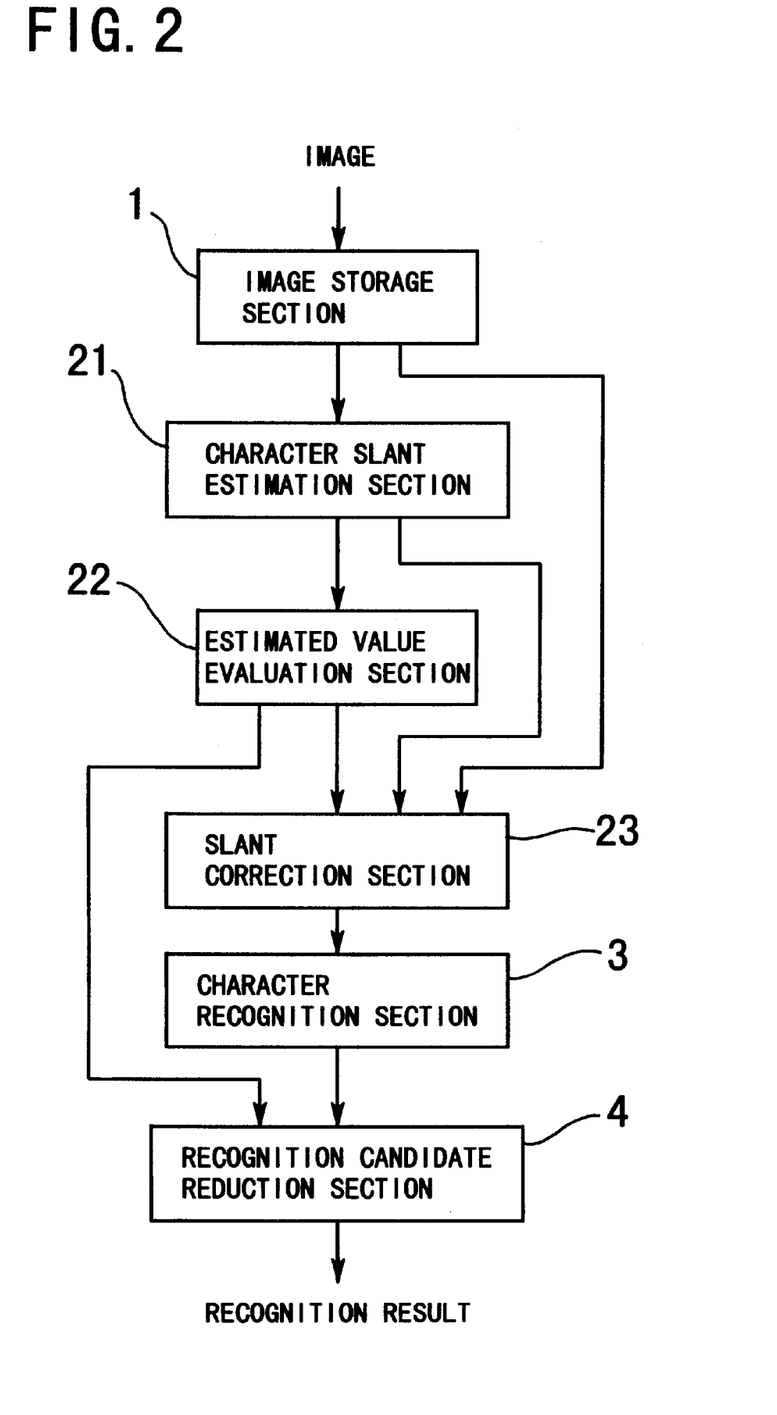
FIG. 2 is a similar view but showing a functional construction of another character recognition apparatus to which the present invention is applied;.

Referring now to FIG. 2, there is shown in block diagram another character recognition apparatus to which the present invention is applied. The character recognition apparatus shown includes an image storage section 1 for storing a character image, a character slant estimation section 21 for calculating and outputting an estimated value of the slant angle of a character, an estimated value evaluation section 22 for calculating and outputting an evaluation value indicative of the validity of the estimated value, a slant correction section 23 for determining a character slant correction amount based on outputs of the character slant estimation section 21 and the estimated value evaluation section 22 and performing slant correction using the character slant correction amount, a character recognition section 3 for recognizing and outputting the character, and a recognition candidate reduction section 4 for selectively adopting a plurality of recognition candidates outputted from the character recognition section 3 using the output of the estimated value evaluation section 22 to reduce the number of candidates. Here, although a pre-processing section for binarization processing and so forth is not shown in FIG. 2 similarly as in the character recognition apparatus described above with reference to FIG. 1, it may be employed when necessary.

The image storage section 1 outputs, similarly as in the character recognition apparatus of FIG. 1, a character image to the character slant estimation section 21 and the slant correction section 23.

The character slant estimation section 21 outputs, similarly as in the character recognition apparatus of FIG. 1, an estimated value X of the slant angle of the characters and the set of evaluation values y1, y2, . . . , yn indicative of the degrees of correctness of the slant angles to the estimated value evaluation section 22.

The estimated value evaluation section 22 calculates the validity R of the estimated value in a similar manner as in the character recognition apparatus of FIG. 1 described above and outputs the value R to the slant correction section 23 and the recognition candidate reduction section 4.

The slant correction section 23 calculates a slant correction amount X* in a similar manner as in the character recognition apparatus of FIG. 1 described above, performs slant correction of the image and outputs the image after the correction to the character recognition section 3.

The character recognition section 3 recognizes characters in a similar manner as in the character recognition apparatus of FIG. 1 described above and outputs not character codes by themselves but a candidate list of a result of the recognition to the recognition candidate reduction section 4. In the candidate list of the recognition result, a fixed number of recognition candidates are listed, for example, in an ascending order of the distance to the template in a feature value space.

The recognition candidate reduction section 4 modifies the contents of the candidate list of the recognition result based on the validity R of the estimated value received from the estimated value evaluation section 22 and outputs the candidate list of the changed contents. In particular, where R is low, it is determined that the stroke group in the input image does not have a fixed directionality, and candidates of kanji in the candidate list of the recognition result are removed. On the other hand, where R is high, it is determined that the stroke group in the input image has a fixed directionality, and candidates other than candidates of kanji in the candidate list of the recognition result are removed. This utilizes the characteristic that, while the stroke group of kanji characters generally has a fixed directionality, characters other than kanji characters do not have a fixed directionality.

While the recognition candidate reduction section 4 realizes means for distinguishing candidates of kanji and candidates not represented by kanji among the candidates of the recognition result in which various characters may be included, the present invention is not limited to the realization wherein kanji and non-kanji characters are distinguished from each other. According to the present invention, since a character group in a character image wherein a stroke group has a fixed directionality and another character group wherein a stroke group has no fixed directionality can be distinguished from each other, candidate reduction to recognition result can be realized by distinguishing arbitrary character groups having characteristics of whether or not the stroke group has a directionality. For example, the character recognition apparatus may be constructed such that a group of numerals 1, 4, 7 and 9 wherein the stroke group has a fixed directionality and another group of numerals 2, 3, 5, 6 and 8 wherein the stroke group does not have a fixed directionality are distinguished from each other to reduce candidates of the recognition result.

Figure 9:
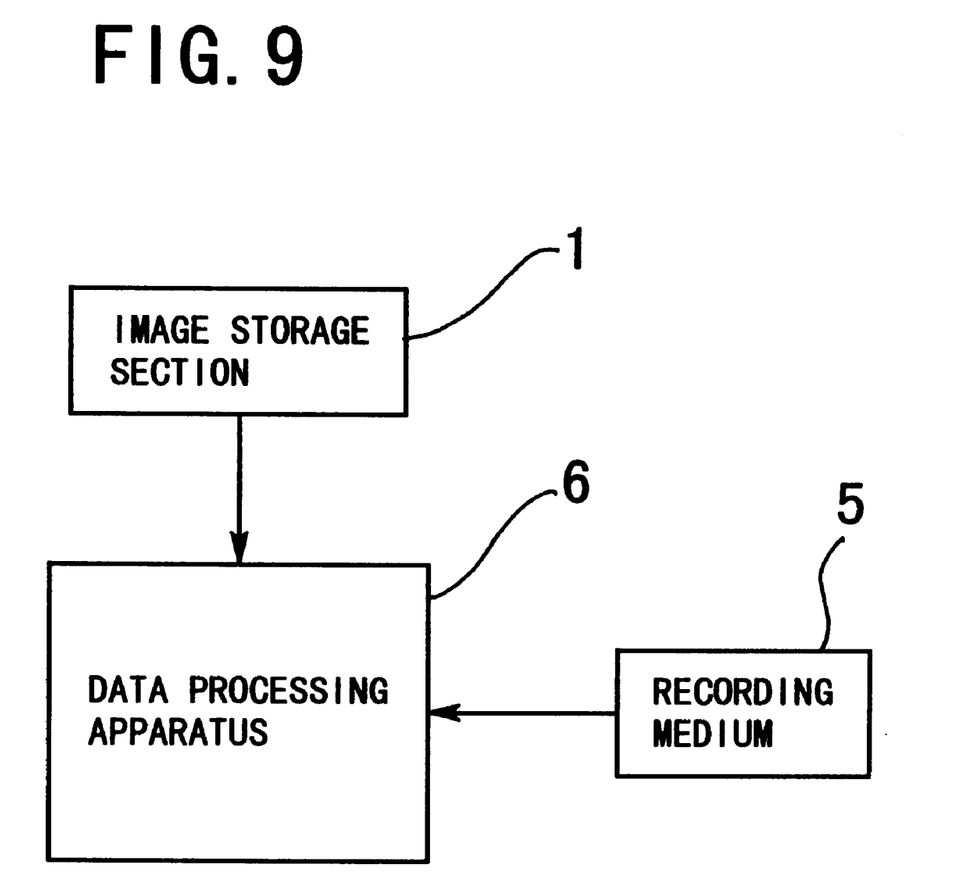
FIG. 9 is a block diagram showing an applied system of the present invention.

Referring now to FIG. 9, there is shown an example of an applied system of the present invention. The applied system shown includes a recording medium 5 on which a character recognition program for carrying out the character recognition method according to the present invention is recorded. The recording medium 5 may be a CD-ROM, a magnetic disk, a semiconductor memory or some other recording medium and includes communication by a network.

The character recognition program is read from the recording medium 5 into a data processing apparatus 6 and controls operation of the data processing apparatus 6. The data processing apparatus 6 estimates, under the control by the character recognition program, the slant angle of a character, evaluates the validity of the slant angle estimated value, determines a slant angle correction amount from the slant angle estimated value and the validity evaluation value, performs slant correction based on the correction amount and then performs character recognition. In an applicable form, the data processing apparatus 6 executes, under the control by the character recognition program, processing same as the processing of the character slant estimation section 21, estimated value evaluation section 22, slant correction section 23 and character recognition section 3 of the character recognition apparatus of FIG. 1. Meanwhile, in another applicable form, the data processing apparatus 6 executes, under the control by the character recognition program, processing same as the processing by the character slant estimation section 21, estimated value evaluation section 22, slant correction section 23, character recognition section 3 and recognition candidate reduction section 4 in the second embodiment.

What is claimed is:

1. A character recognition method wherein a slant angle of a character is corrected to recognize the character, comprising the steps of:

estimating a slant angle of a character;

evaluating a validity of the slant angle estimated value, said evaluating step including calculating a validity evaluation value indicative of the validity of the slant angle estimated value;

determining a slant correction amount from the slant angle estimated value and the validity evaluation value;

performing slant correction of the character based on the slant correction amount, said performing step including correcting a slant of the character by a percentage of the slant angle estimated value, said percentage based on a magnitude of the validity evaluation value calculated in said evaluating step; and performing character recognition of the character.

2. A character recognition method as claimed in claim 1, wherein said evaluating step includes calculating the validity of the slant angle estimated value based on an information amount derived from evaluation values generated in said estimating step.

3. A character recognition method wherein a slant angle of a character is corrected to recognize the character, comprising the steps of:

estimating a slant angle of a character;

evaluating a validity of the slant angle estimated value;

determining a slant correction amount from the slant angle estimated value and the validity evaluation value;

performing slant correction of the character based on the slant correction amount and then performing character recognition of the character to extract character recognition candidates; and discriminating based on the validity evaluated value whether or not a stroke group in a character image has a fixed directionality to selectively adopt the character recognition candidates to reduce the number of candidates.

4. A character recognition method as claimed in claim 3, further comprising:

determining a magnitude of the validity evaluated value, and wherein a degree of slant correction performed in said performing steps is dependent upon the magnitude of the validity evaluation value.

5. A character recognition method as claimed in claim 4, wherein said discriminating step includes:

determining that said stroke group does not have said fixed directionality if the magnitude of the validity evaluated value lies within a predetermined range; and determining that said stroke group has said fixed directionality if the magnitude of the validity evaluated value does not lie within said predetermined range.

6. A character recognition method as claimed in claim 5, further comprising:

removing candidates of kanji are removed from said character recognition candidates when the validity evaluated value lies within said predetermined range; and removing other than kanji candidates when the validity evaluated value does not lie within said predetermined range.

7. A character recognition apparatus wherein a slant angle of a character is corrected to recognize the character, comprising:

character slant estimation means for calculating and outputting an estimated slant angle value of a character;

estimated value evaluation means for calculating and outputting an evaluation value representative of a validity of the estimated slant angle value; and slant correction means for determining a character slant correction amount based on outputs of said character slant estimation means and said estimated value evaluation means to effect slant correction of the character, said slant correction means correcting a slant of the character by a percentage of the estimated slant angle value, said percentage based on a magnitude of the validity evaluation value calculated in said estimated value evaluation means.

8. A character recognition apparatus as claimed in claim 7, wherein said character slant estimation means sets a plurality of slant angle candidates, calculates evaluation values representative of degrees of correctness of the slant angle candidates, calculates a slant angle estimated value based on the evaluation values representative of the degrees of correctness, and outputs the slant angle estimated value together with the evaluation value representative of the degree of correctness.

9. A character recognition apparatus as claimed in claim 7, wherein, when the slant angle estimated value is to be calculated based on the evaluation values representative of the degrees of correctness, said character slant estimation means searches for the highest value of the evaluation values representative of the degrees of correctness and determines one of the slant angle candidates which corresponds to the highest value as the slant angle estimated value.

10. A character recognition apparatus as claimed in claim 7, wherein said estimated value evaluation means calculates and outputs an information amount that the entire evaluation values representative of the degrees of correctness outputted from said character slant estimation means has as an evaluation value representative of a validity of the slant estimated value outputted from said character slant estimation means.

11. A character recognition apparatus as claimed in claim 7, wherein said estimated value evaluation means calculates and outputs a square sum, a square integral or a variance of the evaluated values indicative of the degrees of correctness outputted from said character slant estimation means as the evaluation value representative of the validity of the slant estimated value outputted from said character slant estimation means.

12. A character recognition apparatus as claimed in claim 7, wherein said slant correction means normalizes the evaluation value outputted from said estimated value evaluation means and indicative of the validity to a value from 0 to 1 using a monotone non-decreasing function and utilizes the normalized value as an indication of said percentage for adjustment of the magnitude of the slant correction amount.

13. A character recognition apparatus as claimed in claim 12, wherein a Sigmoid function is used as the monotone non-decreasing function.

14. A character recognition apparatus as claimed in claim 12, wherein a linear function or a sectional linear function is used as the monotone non-decreasing function.

15. A character recognition apparatus as claimed in claim 7, further comprising recognition candidate reduction means for discriminating based on the output of said estimated value evaluation means whether or not a stroke group in a character image has a fixed directionality to selectively adopt the character recognition candidates to reduce the number of candidates.

16. A character recognition apparatus as claimed in claim 15, wherein said recognition candidate reduction means performs discrimination between kanji and non-kanji based on the output of said estimated value evaluation means.

17. A recording medium on which a recognition program which operates on a computer is recorded, the character recognition program causing the computer to execute the steps of:

estimating a slant angle of a character;

evaluating a validity of the slant angle estimated value, said evaluating step including calculating a validity evaluation value indicative of the validity of the slant angle estimated value;

determining a slant correction amount from the slant angle estimated value and the validity evaluation value;

performing slant correction of the character based on the slant correction amount, said performing step including correcting a slant of the character by a percentage of the slant angle estimated value, said percentage based on a magnitude of the validity evaluation value calculated in said evaluating step; and performing character recognition of the character.

\* \* \* \* \*